Aug. 11, 1942.   J. D. McDONALD   2,292,888
DYNAMO-ELECTRIC MACHINE
Filed Sept. 5, 1941   2 Sheets-Sheet 1
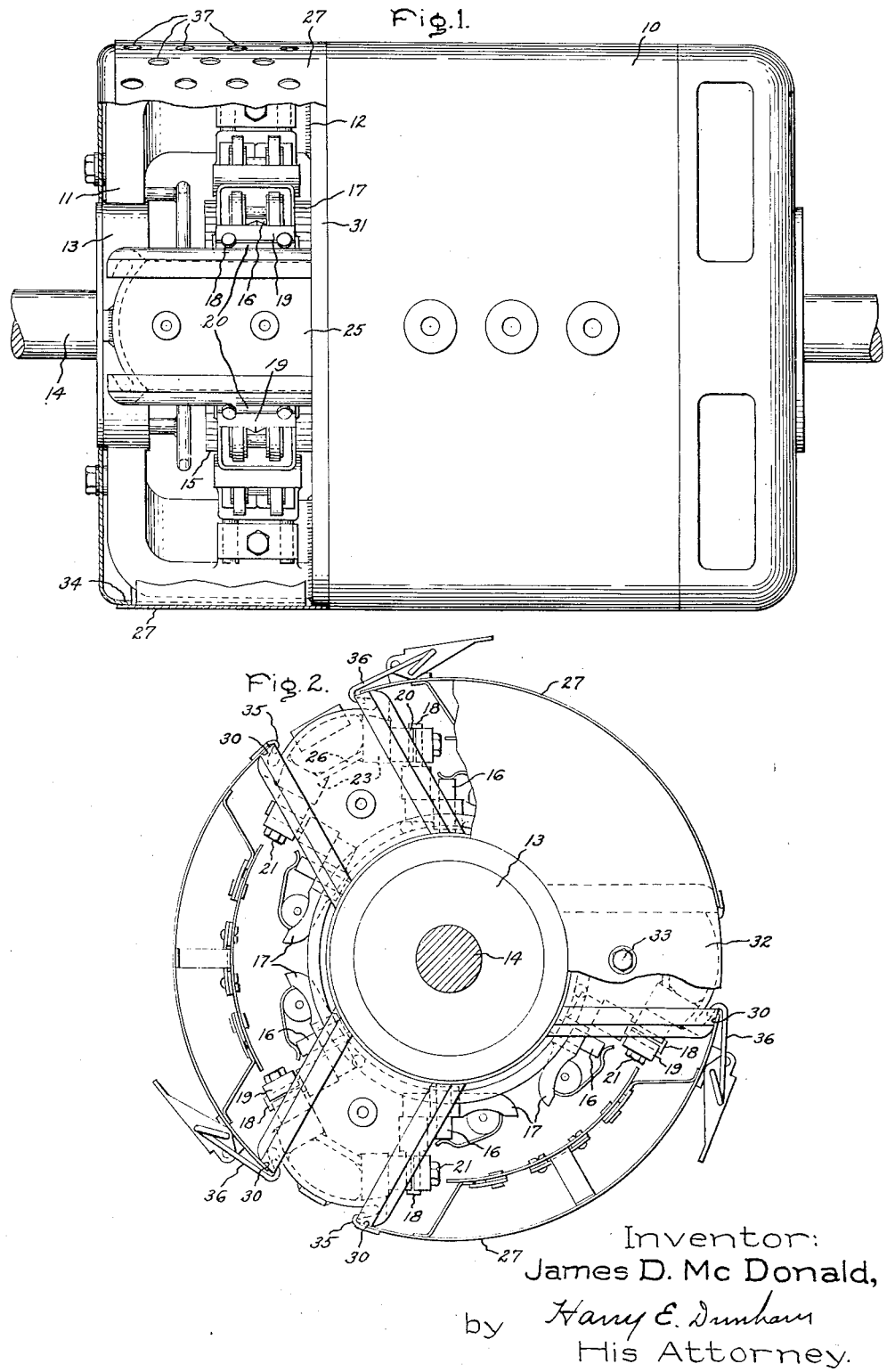
Inventor:
James D. McDonald,
by Harry E. Dunham
His Attorney.

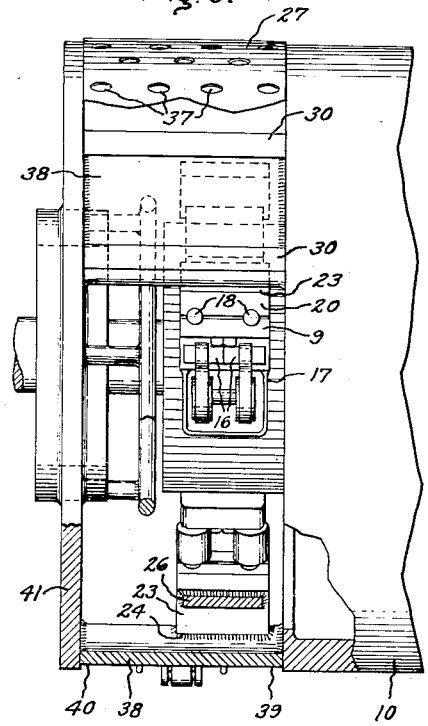

Patented Aug. 11, 1942

2,292,888

UNITED STATES PATENT OFFICE 2,292,888

DYNAMOELECTRIC MACHINE

James D. McDonald, Erie, Pa., assignor to General Electric Company, a corporation of New York Application September 5, 1941, Serial No. 409,604

15 Claims. (Cl. 171—252)

My invention relates to improvements in dynamo-electric machines.

An object of my invention is to provide an improved and simplified dynamo-electric machine frame.

Another object of my invention is to provide an improved dynamo-electric machine end bracket.

Further objects and advantages of my invention will become apparent and my invention will be better understood from the following description referring to the accompanying drawings, and the features of novelty which characterize my invention will be pointed out with particularity in the claims annexed to and forming a part of this specification.

Referring to the drawings, I have shown in Fig. 1 a side elevational view partly broken away of a dynamo-electric machine provided with my improved frame construction; Fig. 2 is an end elevational view of the machine shown in Fig. 1 partly broken away to show more clearly the relative arrangement of the end bracket and the cover and brush holders; Fig. 3 is an end view of a channel section used in making my improved end bracket supporting arm; Fig. 4 illustrates the first step in forming the end bracket arm from the channel section shown in Fig. 3; Fig. 5 shows the next step in forming the channel section member of Fig. 3 and my improved end bracket arm; Fig. 6 is a side elevational view of an embodiment of my improved end bracket arm before it is secured to the magnet frame and bearing housing as shown in Figs. 1 and 2; Fig. 7 is an end view of the bracket arm shown in Fig. 6; Fig. 8 is a perspective view of a modification of my improved end bracket arm; Fig. 9 is a side elevational view partly broken away of a dynamo-electric machine embodying the modification of my end bracket arm shown in Fig. 8; and Fig. 10 is an end view partly broken away of the dynamo-electric machine shown in Fig. 9.

In the drawings, I have shown a dynamo-electric machine provided with a stationary member having a frame including a substantially cylindrical magnet frame member 10 provided with channel section end bracket supporting arms 11 integrally secured to the magnet frame by welding at the adjacent ends 12 of the bracket arms. The other ends of the bracket arms 11 are welded to a bearing housing 13 which is adapted to support a bearing in which is mounted a shaft 14 of the rotatable member of the machine. The rotatable member includes a conventional direct current armature provided with a winding connected to a commutator 15. Electrical connections to the commutator 15 are made through brushes 16 which contact the commutator and are supported in any suitable brush holders 17 which must in turn be supported on the stationary magnet frame. These brush holders are provided with insulated studs 18 which in the arrangement illustrated are clamped between blocks 19 and 20 by bolts 21 which threadedly engage openings 22 in brush holder supporting blocks 23. These brush holder supporting blocks 23 are accurately arranged at a predetermined brush holder angle and are integrally secured by welding at 24 to the under side and outer edge of the web 25 of the channel section end bracket arms 11. In the arrangement shown in Figs. 1 and 2, the number of brush holders is such that two brush holder supporting blocks are secured to each end bracket arm. The adjacent inner edges of the brush holder supporting blocks 23 are secured together by a bracing plate 26 welded thereto in order to provide a more rigid structure. The channel section end bracket arms provide a rigid structure of the desired strength with a relatively small cross section and a correspondingly small weight of material thereby reducing the total weight of the dynamo-electric machine.

For traction purposes it has been found desirable to provide covers over the ventilating and inspection openings formed between the bracket arms 11 in order to prevent damage to the machine by accidental entrance of undesirable foreign substances. In order to provide the desired ventilation to the machine I arrange a plurality of end bracket arms 11 in circumferentially spaced apart relationship about the periphery of the frame of the machine and in the illustrated construction, the number of these arms is determined by the number of brush holders of the machine. In the construction shown in Figs. 1 and 2, three of these arms are arranged in equally circumferentially spaced apart relationship with the flanges of the channel sections extending radially outwardly. With such an arrangement I have found that end shield covers 27 can be conveniently secured to the end bracket arms by curving the web 25 of the channel section as shown in Fig. 4 and arranging the channel section arms with the flanges 28 thereof extending radially outwardly therefrom. Latching clamp members are formed on the end bracket arms by turning the outer ends 29 of the flanges 28 circumferentially or transversely inwardly toward the middle of the web 25 as shown in Fig. 5.

After the web and flanges have been suitably formed, the channel section bar is bent to substantially a right angle as shown in Fig. 6 and then is welded to the magnet frame 10 and the bearing housing 13. After this operation, the outer sides 30 of the outer ends 29 of the flanges 28 are turned or ground to a substantially cylindrical curvature of substantially the same outer contour or circumferential diameter as the adjacent part 31 of the magnet frame 10, which also is turned or ground to a smooth finished substantially cylindrical surface slightly less in diameter than the larger portion of the magnet frame 10. An end plate 32 is secured by bolts 33 about the radially extending portions of the end bracket arms 11 and is provided with an axially extending inturned end flange 34 having substantially the same outer diameter as the diameter of the finished surface of the sides 30 of the bracket arm flanges 28 and the finished surface 31 of the magnet frame 10. In this manner a finished surface of uniform diameter is adapted to support all of the edges of the covers 27 and these covers are secured to the machine by hooked latch members 35 at one end thereof and by hooked toggle latch members 36 at the other end thereof, which provide a clamping engagement with the inturned ends 29 of the bracket arms 11. Perforations 37 may be formed in the covers 27 to provide for the admittance of ventilating air into the machine.

In some instances the dynamo-electric machine may not require that the end plate be removable, and in such instances a further simplification of the frame of the machine can be obtained by providing a construction as shown in Figs. 8 to 10, inclusive. In this arrangement the various parts of the machine are essentially the same as those shown in Figs. 1 and 2 except that the channel section end bracket arms 38 extend only axially of the machine and are welded at one end 39 thereof to the magnet frame 10 and at the other end 40 thereof to a radially extending end plate 41 which is integrally secured by welding to the bearing housing 13. In this construction the brush holder supporting blocks 23 may be formed the same as those shown in Figs. 1 to 7 and may be integrally secured by welding in a similar manner to the end bracket arms 38. The covers 27 are supported at their axial edges on the curved finished surfaces 30 of the end bracket arms 38 and may also be supported circumferentially on the end plate 41 and on the adjacent end of the magnet frame 10, although such additional support can be dispensed with if desired.

These constructions provide relatively simple dynamo-electric machine frame structures which include a minimum number of parts and a minimum amount of the machining to provide the desired finished dimensions to the machine. Furthermore, since these frames for dynamo-electric machines are made of conventional structural sections, they provide relatively stronger constructions with a minimum weight.

While I have illustrated and described particular embodiments of my invention, modifications will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamo-electric machine frame including a magnet frame member, and channel section end bracket supporting arms secured to said magnet frame member and having a web and flanges extending radially outwardly of said machine with the outer ends of said flanges extending circumferentially inwardly toward the middle of said web, the outer peripheral surface of said flanges having substantially the same contour as the adjacent outer surface of said magnet frame member.

2. A dynamo-electric machine frame including a substantially cylindrical magnet frame member, and channel section end bracket supporting arms integrally secured to said magnet frame member and having a web and flanges extending outwardly therefrom, the outer ends of said flanges extending circumferentially inwardly forming latching clamp members for a cover latch, the outer peripheral sides of said outer flange ends being curved to substantially the same outer circumferential diameter as the adjacent part of said magnet frame member.

3. A dynamo-electric machine frame including a magnet frame member, a bearing housing, and channel section end bracket supporting arms integrally secured to said magnet frame member and to said bearing housing having brush holder supporting blocks integrally secured thereto and arranged at a predetermined brush holder angle, said channel section supporting arms having a web and flanges extending radially outwardly of said machine with the outer ends of said flanges extending circumferentially inwardly toward the middle of said web forming latching clamp members for a cover latch.

4. A dynamo-electric machine frame including a substantially cylindrical magnet frame member, a bearing housing, and channel section end bracket supporting arms integrally secured by welding to said magnet frame member and to said bearing housing having brush holder supporting blocks integrally secured thereto by welding and arranged at a predetermined brush holder angle, said channel section supporting arms having a web and flanges with the outer ends of said flanges extending circumferentially inwardly forming latching clamp members for a cover latch.

5. A dynamo-electric machine frame including a substantially cylindrical magnet frame member, a bearing housing, and channel section end bracket supporting arms integrally secured by welding to said magnet frame member and to said bearing housing and having a web and flanges with the outer ends of said flanges extending circumferentially inwardly forming latching clamp members for a cover latch, the outer peripheral sides of said outer flange ends being accurately curved to a substantially cylindrical surface to substantially the same outer diameter as the adjacent part of said magnet frame member.

6. A dynamo-electric machine frame including a substantially cylindrical magnet frame member, a bearing housing, and channel section end bracket supporting arms integrally secured to said magnet frame member and to said bearing housing having brush holder supporting blocks integrally secured thereto at a predetermined brush holder angle, said channel section supporting arms having a web and flanges with the flanges extending radially outwardly of said machine with the outer ends of said flanges extending circumferentially inwardly toward the middle of said web and curved to a substantially cylindrical outer surface substantially the same as the adjacent outer surface of said magnet frame member.

7. A dynamo-electric machine frame including a substantially cylindrical magnet frame member, a bearing housing, channel section end bracket supporting arms integrally secured to said magnet frame and to said bearing housing having brush holder supporting blocks integrally secured thereto and arranged at a predetermined brush holder angle, said channel section supporting arms having a web and flanges with the outer ends of the flanges extending circumferentially inwardly forming latching clamp members for a cover latch, and means including an end cover having hooked latch members adapted to form a latching engagement with said bracket arm flange clamp members for securing said cover to said end bracket arms.

8. A dynamo-electric machine frame including a magnet frame member, a bearing housing, channel section end bracket supporting arms secured to said magnet frame and to said bearing housing having brush holder supporting blocks integrally secured thereto, said channel section supporting arms having a web and flanges with said flanges extending radially outwardly of said machine with the outer ends of said flanges extending circumferentially inwardly toward the middle of said web forming latching clamp members for a cover latch, and means including an end cover having latch members adapted to form a latching engagement with said bracket arm flange clamp members for securing said cover to said end bracket arms.

9. A dynamo-electric machine frame including a magnet frame member, channel section end bracket supporting arms integrally secured to said magnet frame member and having a web and flanges with the outer ends of the flanges extending circumferentially inwardly forming latching clamp members for a cover latch, the outer peripheral sides of said outer flange ends being curved to substantially the same outer diameter as the adjacent part of said magnet frame member, and means including an end cover having hooked latch members adapted to form a latching engagement with said bracket arm flange clamp members for securing said cover to said end bracket arms.

10. A dynamo-electric machine frame including a substantially cylindrical magnet frame member, a plurality of circumferentially spaced apart channel section end bracket supporting arms providing inspection openings therebetween and being integrally secured to said magnet frame member and having a web and flanges with the outer ends of said flanges extending circumferentially inwardly forming latching clamp members for a cover latch, the outer peripheral sides of said outer flange ends being curved to substantially the same outer diameter as the adjacent part of said magnet frame member, and means including an end cover having latched members adapted to provide a latching engagement with said bracket arm flange clamp members for securing said cover to said end bracket arms over said inspection openings.

11. A dynamo-electric machine frame including a magnet frame member, a bearing housing, channel section end bracket supporting arms secured to said magnet frame and to said bearing housing having brush holder supporting blocks integrally secured thereto, each of said channel section supporting arms having a web and flanges with said flanges extending radially outwardly of said machine with the outer ends of said flanges thereof extending circumferentially inwardly toward the middle of the web forming latching clamp members for a cover latch, each of said outer flange ends having the outer surface thereof conforming substantially to that of the adjacent outer surface of said magnet frame member, and means including an end cover adapted to engage said outer surface of said flange ends and having latch members adapted to form a latching engagement with said bracket arm flange clamp members for securing said cover to said end bracket arms.

12. A channel section end bracket supporting arm for a dynamo-electric machine having a brush holder supporting block integrally secured thereto by welding and arranged at a predetermined brush holder angle, said channel section supporting arm having a web and flanges with said flanges extending outwardly with the outer ends of said flanges extending transversely inwardly toward the middle of said web forming latching clamp members for a cover latch.

13. A channel section end bracket supporting arm for a dynamo-electric machine, said channel section supporting arm having a web and flanges with said flanges extending outwardly from said web with the outer ends of said flanges extending transversely inwardly toward the middle of said web forming latching clamp members for a cover latch.

14. A channel section end bracket supporting arm for a dynamo-electric machine having a brush holder supporting block integrally secured thereto, said channel section supporting arm having a web and flanges with said flanges extending outwardly with the outer ends of said flanges extending transversely inwardly toward the middle of said web forming latching clamp members for a cover latch and having an outer surface arranged to conform substantially to the inner surface of a cover.

15. A channel section end bracket supporting arm for a dynamo-electric machine, said channel section supporting arm having a web and flanges with said flanges extending outwardly with the outer ends of said flanges extending transversely inwardly toward the middle of said web forming latching clamp members for a cover latch and having an outer surface arranged to conform substantially to the inner surface of a cover.

JAMES D. McDONALD.